United States Patent
Jackson

(10) Patent No.: US 6,809,263 B2
(45) Date of Patent: Oct. 26, 2004

(54) CABLE GLAND ASSEMBLY

(75) Inventor: Carl Jackson, Lancashire (GB)

(73) Assignee: Hawke Cable Glands Limited, Lancashire (GB)

(*) Notice: Subject to any disclaimer, the term of this patent is extended or adjusted under 35 U.S.C. 154(b) by 0 days.

(21) Appl. No.: 10/468,383

(22) PCT Filed: Jan. 16, 2002

(86) PCT No.: PCT/GB02/00150
§ 371 (c)(1),
(2), (4) Date: Aug. 19, 2003

(87) PCT Pub. No.: WO02/067399
PCT Pub. Date: Aug. 29, 2002

(65) Prior Publication Data
US 2004/0069522 A1 Apr. 15, 2004

(30) Foreign Application Priority Data
Feb. 20, 2001 (GB) .............................. 0104098

(51) Int. Cl.[7] .............................................. H02G 3/18
(52) U.S. Cl. ................... 174/65 SS; 174/65 R; 174/135; 16/2.1
(58) Field of Search .................... 174/65 R, 65 SS, 174/65 G, 151, 135, 152 G; 439/583, 584, 462, 581; 16/2.1, 2.2; 248/56

(56) References Cited

U.S. PATENT DOCUMENTS

| 4,299,363 A | * 11/1981 | Datschefski ............... 248/56 |
| 4,944,686 A | 7/1990 | Gertz |
| 5,378,027 A | 1/1995 | Gehring |
| 5,545,854 A | * 8/1996 | Ishida .................. 174/153 G |
| 5,912,431 A | * 6/1999 | Sheehan ................. 174/65 R |
| 6,162,995 A | 12/2000 | Bachle et al. |
| 6,300,568 B1 | * 10/2001 | Petri ..................... 174/65 G |

FOREIGN PATENT DOCUMENTS

| DE | 195 44963 A1 | 12/1995 |
| DE | 299 16 204 U1 | 9/1999 |
| EP | 0 551 664 A1 | 12/1992 |
| EP | 0 587 310 A1 | 3/1994 |
| GB | 2 013 420 A | 1/1979 |

OTHER PUBLICATIONS

International Search Report dated Apr. 18, 2002 #PCT/GB02/00150.
UK Search Report dated Jun. 25, 2001 #GB0104098.9.

* cited by examiner

Primary Examiner—Dhiru R Patel
(74) Attorney, Agent, or Firm—Rader, Fishman & Grauer PLLC

(57) ABSTRACT

A cable gland assembly for sealing between a cable and a wall through which the cable passes is described, the assembly having a sealing mechanism includes comprising a sealing sleeve and a sealing sleeve urging device which on relative movement of two assembly parts as forced to urge the sealing sleeve in a sealing direction, the sealing sleeve urging device having a plurality of fingers mounted in a cylindrical formation on a support ring and wherein each finger is pivotable generally about the location at which the finger is mounted on the ring and each finger is relatively stiff thereby to remain substantilly straight when forced to pivot, the assembly being characterised in that te sealing sleeve has a flange at one end of said sleeve.

20 Claims, 2 Drawing Sheets

CABLE GLAND ASSEMBLY

FIELD OF THE INVENTION

The invention relates to cable gland assemblies.

DESCRIPTION OF THE INVENTION

Cable gland assemblies typically provide a seal and a mechanical and/or electrical connection between a cable and a wall through which the cable passes. On oil production platforms, for example, cable glands may be used to prevent ingress of water into a junction box.

The applicants EP-A-0587310 discloses a cable gland assembly consisting essentially of an adaptor, a sleeve, a cap nut and a clamping arrangement. The adaptor and the sleeve are screwed together with the clamping arrangement effectively held captive therebetween, and the adaptor is screwed into a hole in a wall through which the cable is intended to pass. A seal seated in an annular recess within the cap nut is compressed axially when the cap nut is screwed onto the sleeve and the resulting radial deformation brings the seal into sealing engagement with the sheathing of a cable.

U.S. Pat. No. 6,162,995 describes a cable gland assembly which has a segmented clamping ring having two sets of pivotable fingers extending in opposite directions from a central portion which has a groove for receiving an "O" ring seal. One set of fingers are adapted to grip an armouring sheath on the cable within the gland assembly whilst the second set of fingers are adapted to close a plain tubular sealing sleeve down upon an outer sheath of the cable to seal therearound. However, once the second set of fingers have closed down to a predetermined aperture size it is not possible for them to close any further as they are all effectively locked together in a solid ring as the gaps between the fingers are defined by radially extending faces which are unable to slide relative to each other. A further disadvantage is that the only sealing of the interior of the gland assembly against ingress of fluids, other than the sealing sleeve, is the "O" ring seal which under some pressure conditions can be inadequate for the purpose.

In order to minimise the number of different component parts that need to be manufactured, stocked and supplied, there is a drive towards the universal cable gland, that is, a gland that can cope with a wide variety of types and sizes of cables. For example, the cap nut sealing mechanism described above is adapted, by virtue of radial deformation, to operate with a range of diameters of cable. However, in order to satisfy the full range, it is still necessary to manufacture several different seal sizes. If the range over which the seal operated could be improved still further, component manufacture could be additionally simplified.

Electrical cables are made up according to purpose, operating conditions etc. Generally, all cables have one or more central conducting cores, within insulating material, surrounded by sheathing. The type of sheathing may vary according to requirements and there may be one or more layers of sheathing: for instance, one of the layers may be of solid metal or wound or interwoven wires for mechanical protection or electrical screening. For example, cables intended for laying in underground cable channels may be sheathed with solid lead so as to prevent rats or other rodents biting through them.

For metal sheathed cables, there is a need to maintain electrical continuity between the metal sheathing and earth. Such continuity may be provided through the cable gland assembly, which may be earthed, for example, through a tag typically comprising an apertured plate clamped between parts of the assembly. In order to ensure an electrical connection between the sheathing and the assembly, an earth continuity device may be provided which bridges any electrical contact gap. For instance, for anti-rodent lead sheathing, a lead collar may be fitted around the exposed sheath and the assembly may be adapted to receive the collar such that, on screwing together the parts of the assembly, the collar is compressed into electrical contact with both the sheathing and the one or more of the parts.

SUMMARY OF THE INVENTION

According to a first aspect, the invention provides a cable gland assembly for sealing between a cable and a wall through which the cable passes, the assembly having a sealing mechanism comprising a sealing sleeve and a sealing sleeve urging device which on relative movement of two assembly parts is forced to urge the sealing sleeve in a sealing direction, the sealing sleeve urging device having a plurality of fingers mounted in a cylindrical formation on a support ring and wherein each finger is pivotable generally about the location at which the finger is mounted on the ring and each finger is relatively stiff thereby to remain substantially straight when forced to pivot, the assembly being characterised in that the sealing sleeve has a flange at one end of said sleeve.

The pivoting of the fingers brings about a displacement of the seal means and stiffness in the fingers facilitates the achievement of maximum degree of displacement. Hence, this contributes towards the achievement of a universal assembly. For example, in the event that the seal means and device are seated within the cap nut, the stiffness means that effective sealing can still be achieved even though the fingers of the device may be protruding out, beyond the open end of the cap nut.

The seal means may comprise a sealing sleeve. The sleeve may be top hat shaped, with a flange at one end. The outer surface of the sleeve may be profiled so as to include a recess. Each of the fingers may be provided with a projection which, on fitting the urging device and the sleeve together, extends into the sleeve recess. The projection and recess may prevent the sleeve from rucking or becoming misshapen so as to seal ineffectively. The flange may be scalloped such that, when the sleeve is fitted together with the urging device, the flange effectively wraps around the support ring of the urging device. The leading edge of the sleeve, that is the end opposite the flange, may be bull nosed or rounded. Both of the latter two features also assist in the sealing process. On relative movement of two parts of the assembly, the internal section of one of the parts may slide across the outer surface of the fingers, which section is shaped thereby to force the fingers in a sealing direction. The leading edge of the fingers may be tapered and the section of the part may be ramped so as to assist in the sliding process. The part may be the cap nut which is screwed on to the assembly at the end opposite to the end which passes through the wall.

According to a second aspect, the invention provides a cable gland assembly for sealing between a metal sheathed cable and a wall through which the cable passes having conducting means for bridging any electrical contact gap between the cable sheathing and a part of the assembly, which means comprises at least one resiliently flexible conductor.

A resiliently flexible conductor has the advantage over the prior art that it is not dedicated to one or, at least, a limited range of cable sizes, so it assists in the provision of a universal assembly. Also, it is not permanently deformed thereby enabling a cable to be removed, without damage, and re-used.

BRIEF DESCRIPTION OF THE DRAWINGS

The invention will now be described, by way of example, with reference to the following drawings, in which.

DESCRIPTION OF THE PREFERRED EMBODIMENT

Figure 1:
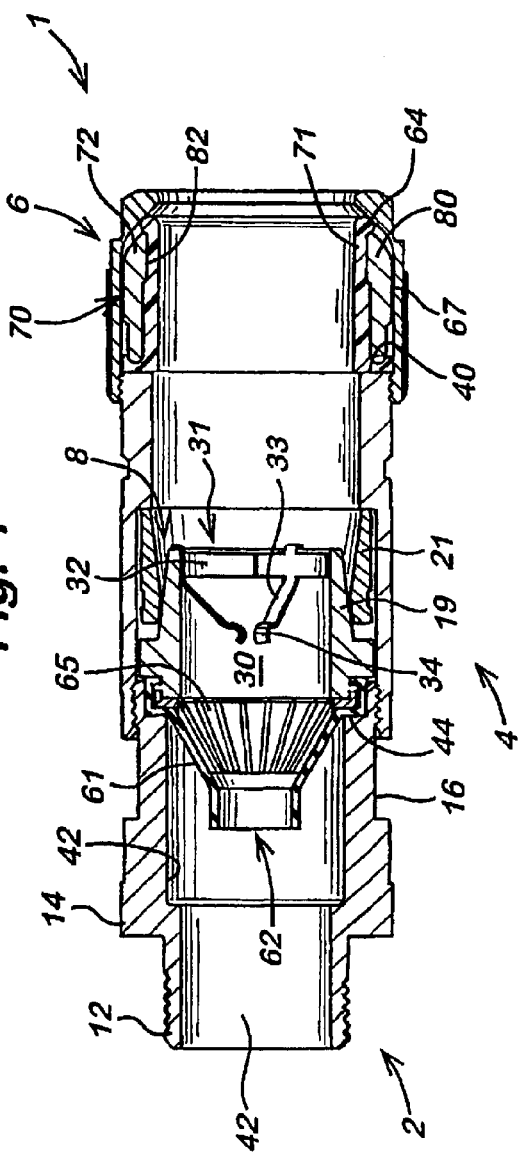
FIG. 1 is a side cross sectional view of a cable gland assembly according to an embodiment of the invention.

With reference to FIG. 1, a cable gland assembly indicated generally at 1 consists essentially of four parts: an adaptor 2, a sleeve 4, a cap nut 6, all made from brass, and a clamping arrangement 8.

The adaptor 2 has a radially extending flange 14 which is partly hexagonally shaped for a spanner. To one side of the flange 14 the adaptor 2 has an externally threaded entry portion 12 for insertion through a hole in the wall of, say, a junction box (not shown). The adaptor 2 is fastened to the wall with a nut (not shown) screwed on to the entry portion 12 after insertion. To the other side of the flange 14, the adaptor 2 has an externally threaded attachment portion 16, which is of larger diameter than the entry portion 12. The adaptor 2 has a multiply stepped bore 42, which gradually decreases in diameter towards the entry portion end, and the step nearest the attachment portion end provides a shoulder 44. A rubber diaphragm deluge seal 61 with a central opening 62 capable of expanding to accommodate various different diameters of cable is seated against the shoulder 44. Within the seal 61 is a cable grip 65 constituted by a ring of flexible fingers.

The sleeve 4 has at one end an internal thread for engagement with the thread on the attachment portion 16. At its opposite end, the sleeve 4 is externally threaded to receive the cap nut 6. The cap nut 6 is shaped for a spanner so that it can be screwed on to the sleeve 4.

A sealing mechanism 70 comprising a radially innermost polymeric material sealing sleeve 71 which fits inside and is surrounded by a generally cylindrical sleeve urging device 72. The mechanism 70 is disposed within an annular recess defined by the internal surface 67 of the cap nut 6 and the end wall 40 of the sleeve 4. In the non-sealing state, the sleeve 71 and device 72 sit between the end wall 40 of the sleeve 4 and a ramped section 64 of the internal surface 67 of the cap nut 6. The effect of screwing the cap nut 6 on to the sleeve 4, and thereby shortening the distance between the end wall 40 and the ramped section 64, is to force the device 72 radially inwards thereby urging the seal 71 radially inwards, that is, in a sealing direction.

Figure 2B:
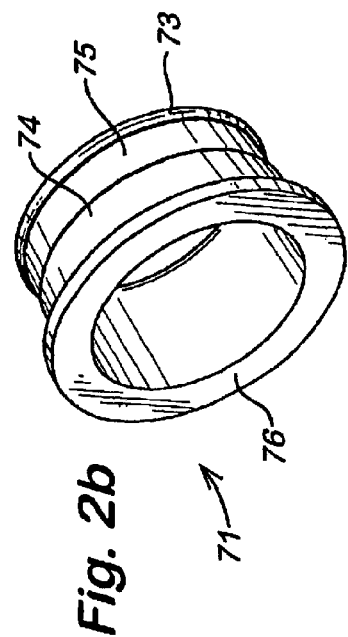
FIGS. 2a and 2b are side cross sectional and perspective views respectively of a sealing sleeve used in the assembly shown in FIG. 1.
Figure 2A:
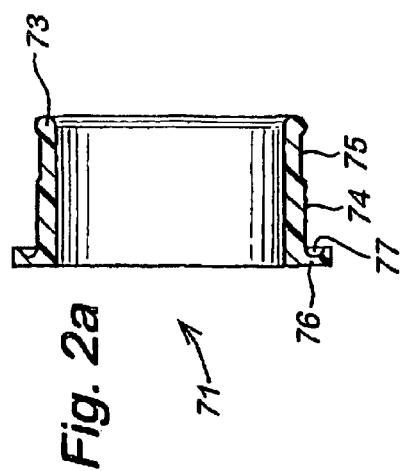

With further reference to FIGS. 2a and 2b, the sleeve 71 is open-ended and generally of top hat shape; that is to say, it is substantially cylindrical along most of its length and flanged at one end. The leading edge 73, that is, the edge intended for positioning furthest away from the sleeve 4, is bull nosed or rounded. The outer, substantially cylindrical wall 74 is profiled, having an annular recess 75 which matches a projection (see later) on the device 72. The flange 76 is provided with a scallop 77 in which a support ring (see later) of the device 72 is received such that the flange 76 effectively wraps around the ring.

Figure 3A:
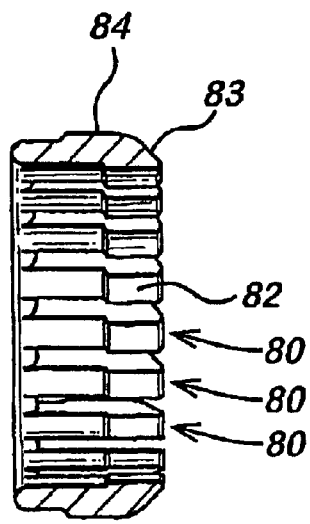
FIGS. 3a and 3b are side cross sectional and perspective views respectively of a sleeve urging device used in the assembly shown in FIG. 1.
Figure 3B:
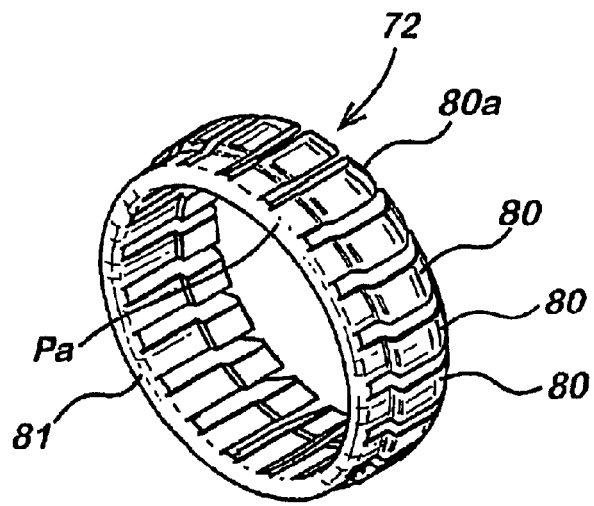

With further reference to FIGS. 3a and 3b, the urging device 72 comprises a number of fingers 80 mounted in a cylindrical formation on a support ring 81. The fingers 80 are spaced apart in overlapping fashion so as to be able to slide relative one to another when acted upon radially, thereby enabling the effective diameter of the cylindrical formation to be reduced. Each of the fingers 80 is pivotable about the location at which it is mounted on the support 81. For example, finger 80a is pivotable substantially about the location Pa. All the fingers 80 are relatively stiff such that a radially inwardly acting force applied at any point along the length of a finger 80 will result in that finger 80 pivoting about its corresponding location P whilst remaining substantially straight. In other words, each finger 80 will not bend or flex intermediate its length. Each finger 80 is provided with a projection 82, which extends into the recess 75 in the seal 71, and a tapered leading edge 83. Each finger 80 has an external surface 84.

Figure 4:
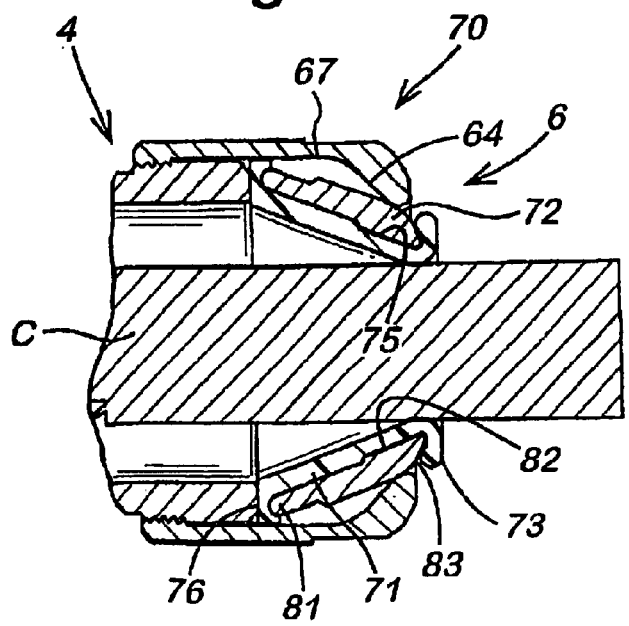
FIG. 4 which shows a side cross sectional view of part of the assembly shown in FIG. 1 with a cable gland inserted.

With reference to FIG. 4, which shows the cap nut end of a cable gland assembly with a cable C inserted therethrough and with the sleeve 71 sealed against the cable sheathing. After the cable C has been inserted, the cap nut 6 is screwed on to the sleeve 4. The internal surface 67 of the cap nut 6 is shaped, that is, it is of gradually reducing internal diameter, such that the effect of screwing the cap nut 6 on to the sleeve 4 is to force the device 72 radially inwardly. The flange 76 of the seal 71 and the ring 81 of the device 72 are stopped against the end wall 40 of the sleeve 4. Thus, the internal surface 67 slides across the outer surface 84 of the device 72 and, in particular, the tapered leading edge 83 of the device 72 runs down the ramped section 64 thereby forcing the fingers 80 radially inwardly. The result of this forcing is to urge the sleeve 71 radially inwardly also against the cable sheathing. The stiffness of fingers 80 means that they can continue effectively to urge the seal against the cable sheathing even when protruding out beyond the open end of the cap nut 6. As a consequence, the sealing mechanism offers universality. Sealing is further assisted by the bull nose leading edge 73 to the seal 71 which causes the seal to roll back around leading edges 83, and the protrusion 82 and recess 75 which serve to prevent rucking and seal compromising deformation of the sleeve 71.

The clamping arrangement 8 comprises first and second clamping parts 19, 21, between which the armour wires of a cable may be clamped. The clamping part 19 is generally cylindrical, having a central bore 30. With further reference to FIG. 1, an earth continuity mechanism 31 is located within the bore 30. The mechanism 31 comprises a mounting ring 32 which is fitted within the bore 30 at the cap nut end thereof; the external diameter of the ring 32 and the internal diameter of clamping part 19 are nominally the same. The ring 32 is fixed by soldering. Extending from the ring 32, generally in the direction of the adaptor 2, are three equiangularly spaced contact fingers 33. In the resting state each finger 33 is inclined with respect to the longitudinal axis of the assembly, so as to point generally inwards. Each finger 33 is flexible, that is, pivotable approximately about its point of attachment to the ring 32. The flexibility is resilient such that, although each finger 33 is movable effectively transversely of the assembly, it is continually urged to return to the resting state and position. Each finger 33 is provided at its free end with a contact promoting kink 34. Hence, in the resting state, there is a minimum spacing between the kinks 34 but, because of the flexibility of the fingers 33 this spacing may be increased.

In use, a metal sheathed cable is inserted through the assembly, having been stripped back so as to expose the sheathing. The fingers 33, are compliant to the extent that they flex so as to follow the contours of the outer surface of the cable during insertion whilst being urged to maintain contact with the surface at all times. The cable is so stripped back that in its final position the fingers 33, or at least the kinks 34, are urged into contact with the lead sheathing.

Hence, the mechanism 31 is able to comply with cable sections of various thicknesses on insertion and to accommodate various thicknesses of sheathing whilst still ensuring an electrical connection between the sheathing and assembly. In addition, the cable could be removed and re-inserted without the need to replace the cable and/or the continuity mechanism.

What is claimed is:

1. A cable gland assembly for sealing between a cable and a wall through which the cable passes, the assembly comprising:

a sealing mechanism including a sealing sleeve and a sealing sleeve urging device, wherein movement of two assembly parts urges the sealing sleeve in a sealing direction;

the sealing sleeve urging device further including a plurality of fingers mounted on a support ring;

each of the plurality of fingers being pivotable generally about a location at which each of the plurality of fingers are mounted on the support ring, each of the plurality of fingers being relatively stiff to remain substantially straight when pivoting; and the sealing sleeve further including a flange at one end, wherein the flange is urged into sealing engagement with an end wall of one of the assembly parts by the sealing sleeve urging device.

2. A cable gland assembly, as in claim 1, wherein the sealing sleeve is substantially cylindrical having the flange at one end.

3. A cable gland assembly, as in claim 2, wherein an outer surface of the substantially cylindrical portion of the sealing sleeve is profiled to include a recess.

4. A cable gland assembly, as in claim 3, wherein each of the plurality of fingers includes a projection adapted to extend into the recess of the sealing sleeve.

5. A cable gland assembly, as in claim 1, wherein the flange at one end of the sealing sleeve is scalloped such that when the sealing sleeve is joined with the sealing sleeve urging device the flange wraps around the support ring.

6. A cable gland assembly, as in claim 1, wherein the sealing sleeve includes a generally rounded leading edge.

7. A cable gland assembly, as in claim 1, wherein one of the assembly parts includes an internal section shaped such that movement of the assembly parts forces each of the plurality of fingers in a sealing direction.

8. A cable gland assembly, as in claim 7, wherein the internal section is ramped.

9. A cable gland assembly, as in claim 7, wherein the one of the assembly parts with the shaped internal section is a cap nut joined onto the cable gland assembly at an end opposite to an end that passes through the wall.

10. A cable gland assembly, as in claim 1, wherein each of the plurality of fingers includes a tapered leading edge.

11. A cable gland assembly, as in claim 1, wherein the plurality of fingers are arranged in a cylindrical formation on the support ring in an overlapping fashion such that the plurality of fingers slide relative to each other when urged radially inwardly by the sealing sleeve urging device to thereby reduce an effective diameter of the cylindrical formation and the sealing sleeve.

12. A cable gland assembly, as in claim 1, further including an earth continuity mechanism to provide electrical contact between the cable and a portion of the cable gland assembly.

13. A cable gland assembly, as in claim 12, wherein the earth continuity mechanism includes resiliently flexible fingers for contacting the cable.

14. A cable gland assembly, as in claim 13, wherein the resiliently flexible fingers extend from a mounting ring towards the cable, the mounting ring being fixed in electrical contact with the cable by first and second clamping pans.

15. A cable gland assembly for sealing between a cable and a wall through which the cable passes, the assembly having a sealing mechanism comprising a sealing sleeve and a sealing sleeve urging device which on relative movement of two assembly parts is forced to urge the sealing sleeve in a sealing direction, the sealing sleeve urging device having a plurality of fingers mounted in a cylindrical formation on a support ring and wherein each finger is pivotable generally about the location at which the finger is mounted on the support ring and each finger is relatively stiff thereby to remain substantially straight when forced to pivot, and the sealing sleeve has a flange at one end of the sealing sleeve.

16. A cable gland assembly, as in claim 15, wherein the flange is urged into sealing engagement with an end wall of one of the assembly parts by the sealing sleeve urging device.

17. A cable gland assembly, as in claim 15, wherein an outer surface of the sealing sleeve is profiled so as to include a recess and wherein each of the fingers is provided with a projection adapted to extend into the recess of the sealing sleeve.

18. A cable gland assembly, as in claim 15, wherein the flange is scalloped such that, when the sealing sleeve is fitted together with the sealing sleeve urging device, the flange wraps around the support ring.

19. A cable gland assembly, as in claim 15, wherein a section of an assembly part is shaped such that, on relative movement of that part and another part of the assembly, each of the fingers is forced in a sealing direction.

20. A cable gland assembly, as in claim 15, wherein the plurality of fingers are arranged in cylindrical formation on the support ring in overlapping fashion such that the fingers are able to slide relative to one another when urged radially inwardly by the sealing sleeve urging device so as to reduce an effective diameter of the cylindrical formation and the sealing sleeve.

* * * * *